(12) United States Patent
Ponikiewski et al.

(10) Patent No.: US 12,428,048 B2
(45) Date of Patent: Sep. 30, 2025

(54) REACH ADJUSTABLE STEERING COLUMN ASSEMBLY

(71) Applicant: ZF Steering Systems Poland Sp. Z.o.o., Czechowice-Dziedzice (PL)

(72) Inventors: Pawel Ponikiewski, Pewel Mala (PL); Damian Uchyla, Strumień (PL); Artur Wojtalik, Katowice (PL); Radoslaw Szymoszek, Cieszyn (PL); Marcin Brzoska, Zabrzeg (PL); Wojciech Gola, Pszczyna (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 0 days.

(21) Appl. No.: 18/517,537

(22) Filed: Nov. 22, 2023

(65) Prior Publication Data

US 2024/0174283 A1    May 30, 2024

(30) Foreign Application Priority Data

Nov. 25, 2022  (EP) ..................................... 22461633
Dec. 5, 2022   (GB) ..................................... 2218275

(51) Int. Cl.
  *B62D 1/184*  (2006.01)
  *B62D 1/185*  (2006.01)
(52) U.S. Cl.
  CPC ............. *B62D 1/184* (2013.01); *B62D 1/185* (2013.01)

(58) Field of Classification Search
  CPC ................................. B62D 1/184; B62D 1/185
  See application file for complete search history.

(56) References Cited

U.S. PATENT DOCUMENTS

| 5,027,674 A * | 7/1991 | Nolte ..................... B62D 1/185 74/577 M |
| 2009/0013817 A1 | 1/2009 | Schnitzer et al. |
| 2016/0075367 A1* | 3/2016 | Sakuda .................. B62D 1/192 74/493 |
| 2018/0079443 A1* | 3/2018 | Anspaugh .............. B62D 1/192 |

FOREIGN PATENT DOCUMENTS

| CN | 214823571 U | 11/2021 |
| GB | 2415485 A | 12/2005 |
| JP | 2017185874 A | 10/2017 |

* cited by examiner

*Primary Examiner* — Jason D Shanske
*Assistant Examiner* — Matthew James O'Neill
(74) *Attorney, Agent, or Firm* — Kristin L. Murphy

(57) ABSTRACT

A steering column has a telescopic shroud with an upper shroud part and a lower shroud part. The upper part is adjustable with respect to the lower part to provide for reach of the steering column assembly. A steering shaft and a clamp mechanism that adjusts the shroud parts, is included, the clamp mechanism comprising a first cam that pivots about a first pivot axis fixed the upper shroud part, a second cam pivoting around a second pivot axis relative to the upper shroud part, the two pivot axes spaced apart axially. A cam follower is fixed relative to the two pivot axes and to the upper shroud portion.

13 Claims, 5 Drawing Sheets

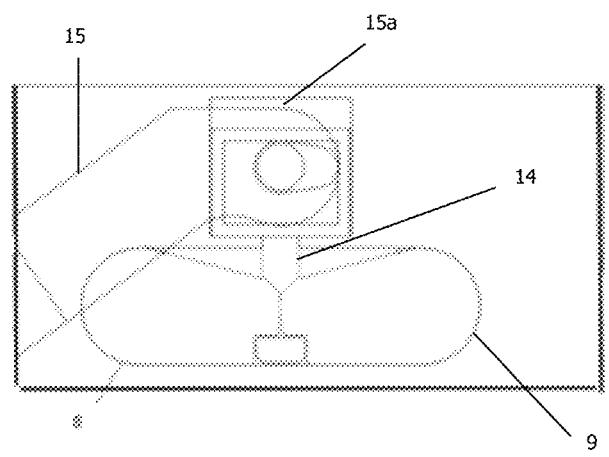
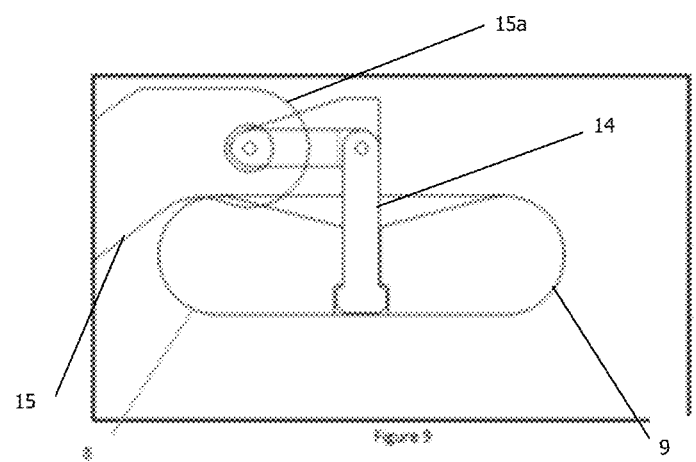

REACH ADJUSTABLE STEERING COLUMN ASSEMBLY

CROSS-REFERENCE TO RELATED APPLICATION

This application claims priority to European Patent Application No. 22461633.4, filed Nov. 25, 2022 and GB Patent Application No. 2218275.2, filed Dec. 5, 2022, the disclosures of which are incorporated herein by reference in their entirety.

TECHNICAL FIELD

This disclosure relates to improvements in reach adjustable steering column assemblies for vehicles.

BACKGROUND

It is known to provide a steering column assembly in which the steering shaft is adjustable for steering wheel reach allowing the driver to position the wheel closer towards them or further away from them to an optimum position. Such assemblies are known as reach adjustable steering columns. To enable this reach adjustment a steering column shroud is provided that supports the steering shaft that in turn supports the steering wheel. The shroud is in two parts, an upper part and a lower part, with the upper part telescoping over or into the lower part to permit the length of the shroud, and hence reach of the steering, to be adjusted. The lower part is secured to the vehicle at first point by a pivot and the upper part is secured to a fixed part of the vehicle at location nearer the steering wheel by a releasable clamp mechanism. When the clamp mechanism is in a locked condition the upper and lower parts of the shroud are locked together. When in an unlocked condition, the upper and lower parts of the shroud can move telescopically to enable reach to be adjusted. The driver can manually move the clamp mechanism between the locked and unlocked conditions by operating a hand lever.

Many designs of such a clamp mechanism are known which prevent unwanted axial movement of the shroud. These are generally intended to prevent movement of the shroud in a direction away from a driver, as happens in a front impact of the vehicle when the torso of an unrestrained driver is thrown forward onto the steering wheel. The applicant has appreciated that substantial axial forces may also be applied in the opposing direction when a heavily set driver lifts herself or herself out of the drivers' seat by pulling on the steering wheel. Prior art steering column clamp assemblies have generally not been designed with this later force in mind and whilst some perform well under such load's others do not.

SUMMARY

What is needed is a steering column assembly which is simple to engage and which is capable of providing a high resistance to axial loads in both direction along the steering column shaft.

According to a first aspect the disclosure, a steering column assembly for a vehicle is provided, the steering column assembly comprising a telescopic shroud comprising an upper shroud part and a lower shroud part, the upper part being adjustable to slide over or slide into lower part to provide adjustment for reach of the steering column assembly, a steering shaft which is supported by the shroud, and a clamp mechanism which releasably fixes the upper shroud part and lower shroud parts in position relative to one another in a locked condition whilst permitting relative axial movement of the first shroud part and second shroud part when in an unlocked condition, in which the clamp mechanism comprises:

a first cam arranged to pivot around a first pivot axis that is fixed relative to the upper shroud part and carrying a set of teeth formed on a part of the cam periphery, a second cam arranged to pivot around a second pivot axis that is fixed relative to the upper shroud part and carrying a set of teeth formed on a part of the cam periphery, the two pivot axes being spaced apart in an axial direction of the shroud;

a cam follower that is fixed relative to the two pivot axes and relative to the upper shroud portion that carries a first rack of teeth that face the teeth of the first cam and a second rack of teeth that face the teeth of the second cam, the first rack being offset axially from the second rack in the axial direction of the upper shroud portion;

and a locking mechanism that is operable to rotate the two cams around their pivot axes between a first position in which the teeth of both cams are held clear of the respective facing rack of teeth of the cam follower and a second position in which the teeth of both cams are urged into engagement with the teeth of the respective rack of the cam follower, whereby axial movement of the cam follower as the shroud collapses whilst the clamp mechanism is in the locked position causes the first cam to rotate in a direction that causes an increasing force to be applied from the teeth of the first cam onto the teeth of the first rack of the cam follower and whereby axial movement of the cam follower as the shroud extends whilst the clamp mechanism is in the locked position causes the second cam to rotate in a direction that cause an increasing force to be applied from the teeth of the second cam onto the teeth of the second rack of the cam follower whilst the second cam moves in an anticlockwise direction to reduce the pressure on the cam follower.

The disclosure provides for secure clamping of the cam onto the follower to resist any axial movement for forces applied during a crash and also forces in the opposite direction caused by a driver pulling on a steering wheel.

The two cams and the two racks may be arranged so that for any given axial movement of the shroud the two cams may rotate in the opposite directions. The cams follow the direction of movement of the cam follower.

The cam follower may be substantially restrained against tangential movement away from the cam followers. Of course there will inevitably be a small amount of tangential movement due to the resilience of the components and free play between various components that make up the steering assembly.

The two cams may be flipper like and may face one another to give the cams the appearance of the two flippers in a modern pin ball machine. Each cam may therefore form a generally elongate lever with the pivot close to one end of the lever and the teeth extending along an edge of the lever located at or towards the free end, the free ends of the two levers facing towards one another. In this arrangement the portions of the cams that carry the teeth may be located closer to each other than the two pivot axes are located relative to each other.

The cams may be located so that they are in line or may overlap with one another.

The length of each lever measured from the pivot axes to at least one of the teeth should be greater than the smallest distance between the pivot and any of the teeth of the corresponding rack of cam follower so that the cam cannot fully rotate as it is moved by the cam follower.

The two racks of teeth of the cam follower may lie along a plane parallel to the axis of movement of the shroud when moving telescopically.

The two sets of teeth of the cam follower may be located with a space between them. Each set of teeth may comprise three or more teeth, which may each be identical in shape and size. These teeth may compliment the shape and size of the teeth on the cam such that when engaged one tooth of the cam fits into a complimentary spaced defined by the flanks of two adjacent teeth of a rack.

The location of the follower and cam should be such that for any given reach position of the shroud at least one of the teeth of a cam engage at least one of the corresponding rack of teeth of the follower. This allows the shroud to be adjusted for reach and at any position for a positive engagement to be attained between the cam teeth and the rack of teeth on the follower.

The pivot axes of the two cams may be located along a line that is parallel but offset from a line along which the follower moves when the steering collapses or extends. In this case the two cams can be mirror images of each other.

Of course, each cam may be a different size and shape with respect to the other in which case the line joining the two pivot points does not need to be parallel to the axis of movement of the cam follower.

The pivot axes may be located below the cam follower, or may be located above the cam follower.

The clamp mechanism may include a spring arrangement such as a leaf spring that biases the two cams in a direction that engages the teeth of the two cams with the respective racks of teeth of the follower when clamp mechanism in in the locked condition. One spring may bias both cams or each cam may be associated with a respective spring.

The clamp mechanism may include an actuator mechanism for rotating the two cams around their respective pivot axes away from the cam follower against the force of the spring into an unclamped condition. The actuator mechanism may comprise a locking pin that is connected to the two cams at one end and to a hand lever at the other end, the lever operable to cause the pin to translate to move the clamp mechanism between locked and unlocked conditions.

The lever may be connected to the pin through a linkage that converts a rotary movement of the lever into a linear movement of the pin.

BRIEF DESCRIPTION OF DRAWINGS

There will now be described by way of example only several exemplary arrangements of the present disclosure of which:

FIG. 8 is a view of an alternative arrangement of the clamp mechanism in which the lever and cams are located above the cam follower; and FIG. 9 is a view of a further alternative arrangement of a clamp mechanism in which the lever is connected to the actuator pin through a linkage.

DETAILED DESCRIPTION

Figure 1:
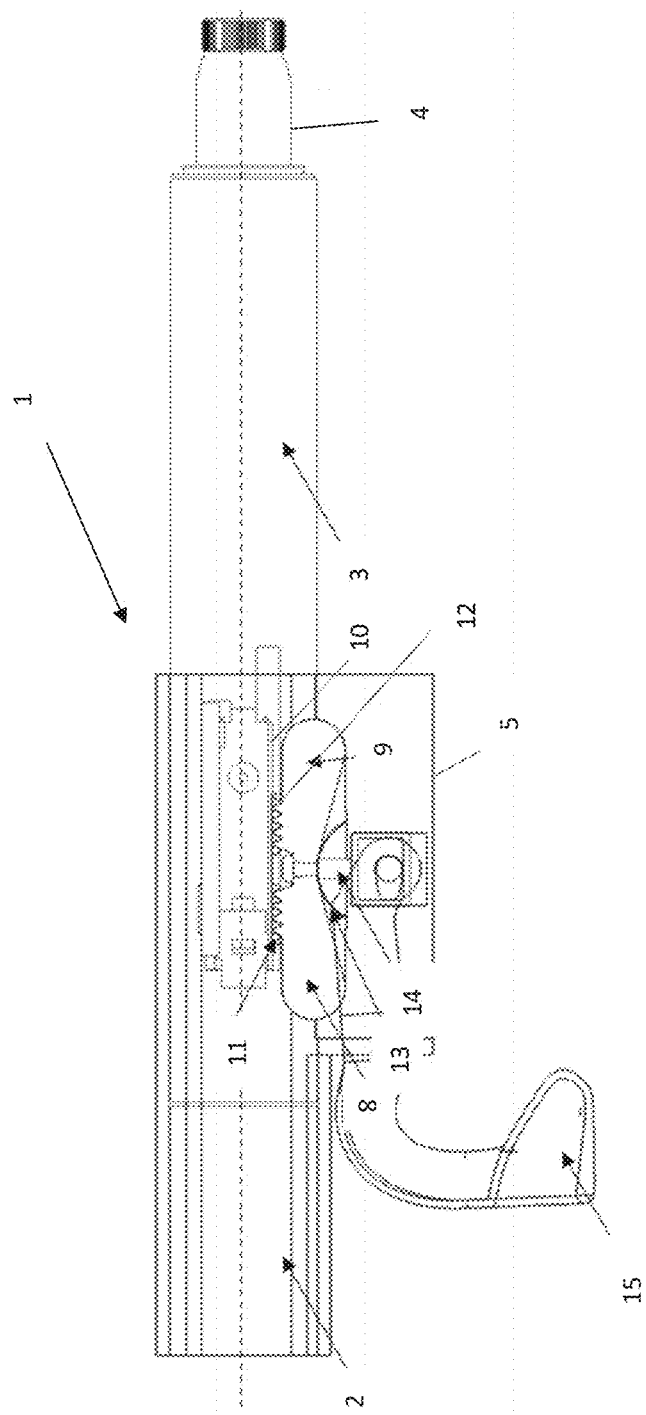
FIG. 1 is a side view of a first exemplary arrangement of a steering column assembly according to the present disclosure.

A steering column assembly 1 is shown in FIG. 1 of the accompanying drawings. The assembly 1 comprises a telescopic shroud having an upper axially movable shroud part 2 and a lower axially movable shroud part 3 with the two connected one inside the other so they can move telescopically. The lower part is fixed to the vehicle (not shown) by a pivot pin to permit rake adjustment to be made but the disclosure can also be applied to arrangements which adjust for reach only.

A telescopic steering shaft 4 is supported in bearings (not shown) journaled to the inside of the shroud. One end of the shaft can be seen projecting from the upper movable shroud part 2. This has a set of splines for engaging with corresponding splines of a steering wheel. An optional electric power assisted steering gearbox may be connected to the end of the steering shaft furthest from the steering wheel and to the lower fixed part of the shroud. The gearbox connects the shaft to a motor which provides assistance when the driver tries to turn the wheel by applying a torque of the same sense as that applied by the driver. The gearbox also connects the shaft 4 through further mechanical links such as a steering rack to the road wheels (not shown) in a known manner.

The telescopic shroud 2,3 is fixed to the vehicle at one point by the pivot (not shown) close to the gearbox and at another point closer to the steering wheel through an adjustable clamp mechanism 5. The clamp mechanism functionally prevents the upper shroud portion 2 moving axially relative to the lower shroud portion 3 when it is in the locked condition, and allows it to move axially when in an unlocked condition to permit reach adjustment of the steering column assembly 1.

The clamp mechanism comprises a support plate 5 that is fixed to the upper shroud portion 2 or integrally formed with that portion for example as a single casting. The plate 5 extends downwards from the upper shroud portion 2 and provides a location for two bores that locate respective pivot pins 6,7 of a pair of cams 8,9. The plate 5 also provides a support for a cam follower 10 that defines a first rack of teeth 11 and a second rack of teeth 12 that are offset axially along the plate. The teeth of each rack face downwards, and each rack has four teeth.

A first cam 8 is supported by a first one of the pivot pins 6 that is located furthest from the steering wheel. The first pivot pin 6 extends through a hole in the cam so that the cam 8 is free to rotate around the axis of the pivot pin. The first cam 8 comprises an elongate lever which extends from the pivot axis towards the steering wheel end of the shroud. An upper edge of the free end of this first cam, by which we mean the end furthest from the pivot pin, carries a set of teeth 8a formed on a part of the cam periphery. The teeth 8a face the teeth of the first rack 11 of the cam follower 10 and rotation of this cam 8 anti-clockwise will cause them to engage whilst rotation clockwise will cause them to disengage.

A second cam 9 is supported by a second one of the pivot pins 7 that is located closet to the steering wheel. The second pivot pin 7 extends through a hole in the cam so that the second cam 9 is free to rotate around the pivot axis. The second cam comprises an elongate lever which extends from the pivot axis away from the steering wheel end of the shroud. An upper edge of the free end of this second cam 9 carries a second set of teeth 9*a* formed on a part of the cam periphery. The teeth face the teeth of the second rack 12 of the cam follower 10 and rotation of this cam 9 clockwise will cause them to engage whilst rotation anti-clockwise will cause them to disengage.

The two cams 8,9 are mirror images of one another and the free ends of the two cams 8,9 are located close to one another so they almost touch.

The cams 8,9 are moved into an out of engagement with the cam follower 10 by an actuator assembly that forms part of the clamp mechanism. This comprises a leaf spring 13 that acts against an underside of each cam to bias the cams into engagement with the cam follower 10. A locking pin 14 is provided that has a head 14*a* on one end with engages with the cams on the same side as the cam follower 10 and extends down between the free ends of the two cams 8,9 and through a hole in the leaf spring 13 to connect to a locking lever 15. The lever 15 has a cam 16 formed on one end that acts on the end of the pin to transform rotary motion of the lever into translation of the locking pin.

Figure 2:
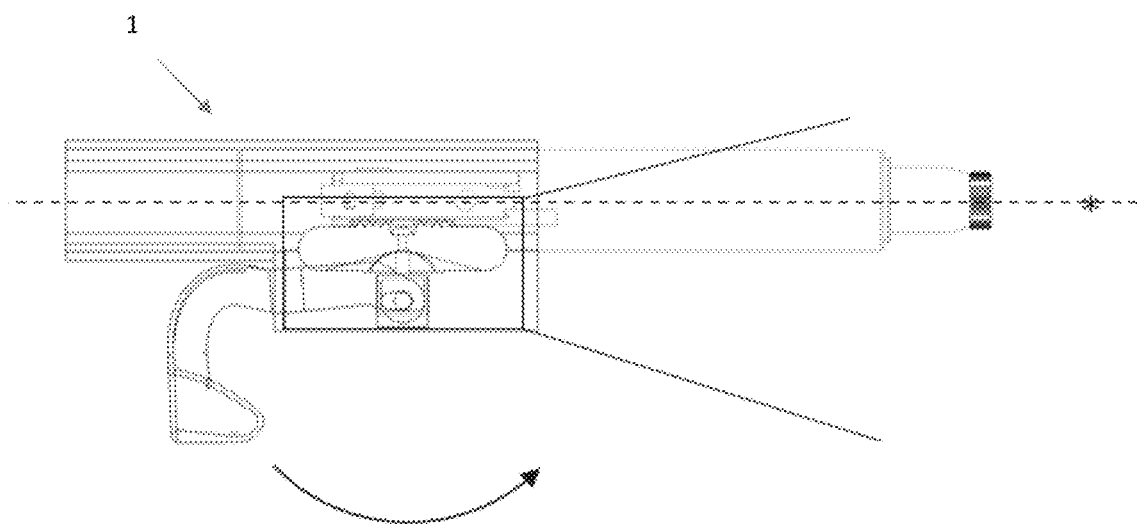
FIG. 2 is view corresponding to FIG. 1 showing the steering column assembly in a locked condition.
Figure 3:
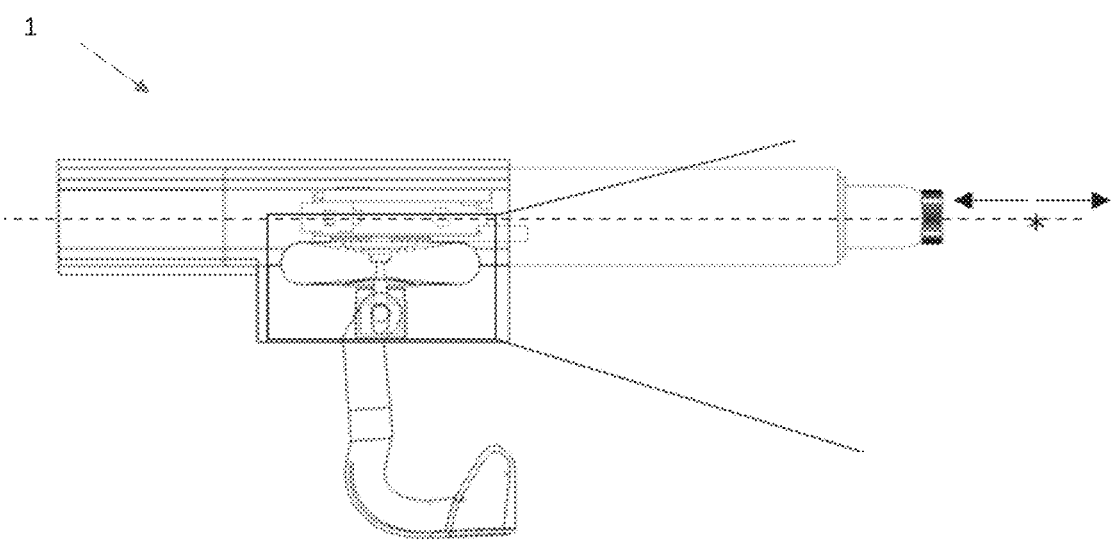
FIG. 3 is the same view as FIG. 2 showing the steering column assembly in an unlocked condition to allow reach adjustment.

FIG. 2 shows the clamp mechanism when locked and FIG. 3 shows the clamp mechanism when unlocked. The arrow in FIG. 2 shows the direction of rotation required to move the lever between the locked and unlocked conditions.

Figure 4:
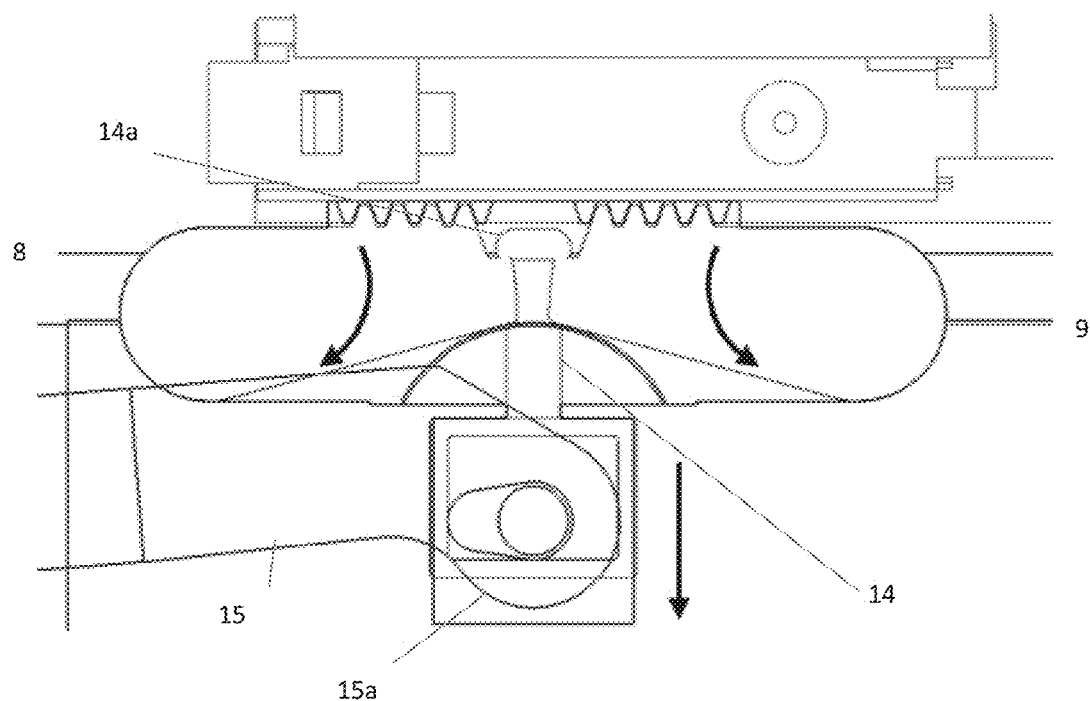
FIG. 4 is an enlarged view of the clamp mechanism in the position shown in FIG. 2.
Figure 5:
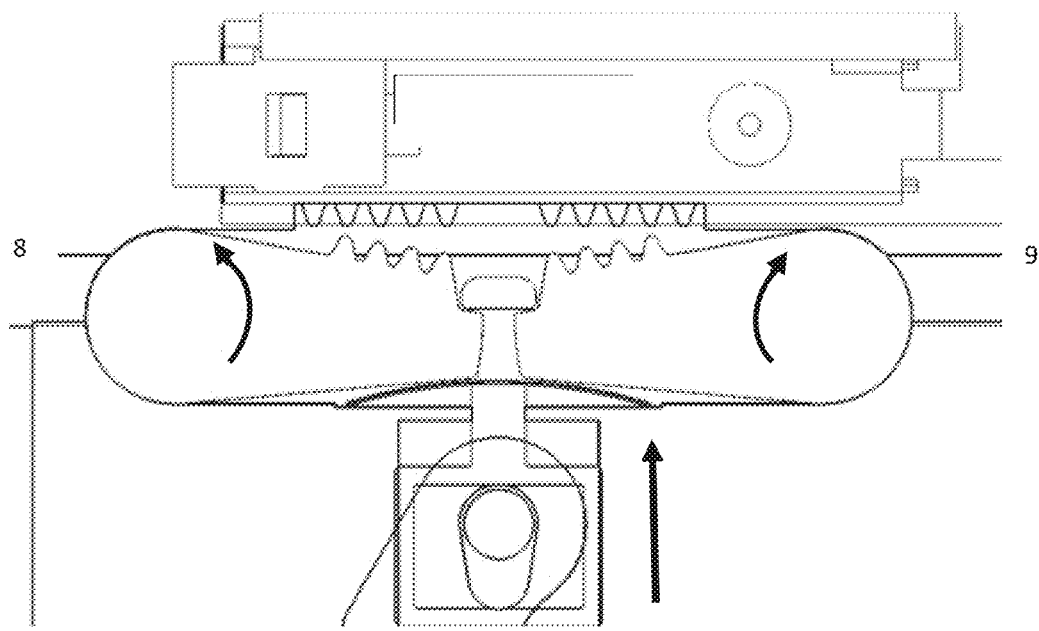
FIG. 5 is the same view as FIG. 3 with the clamp mechanism in the position shown in FIG. 3.

FIG. 4 shows the opposing directions of rotation of the two cams 8,9 when moving from the locked to the unlocked condition and FIG. 5 shows the same for moving from the unlocked to the locked condition. The deformation of the leaf spring 13 can be clearly seen along with the translation of the locking pin 14.

Figure 6:
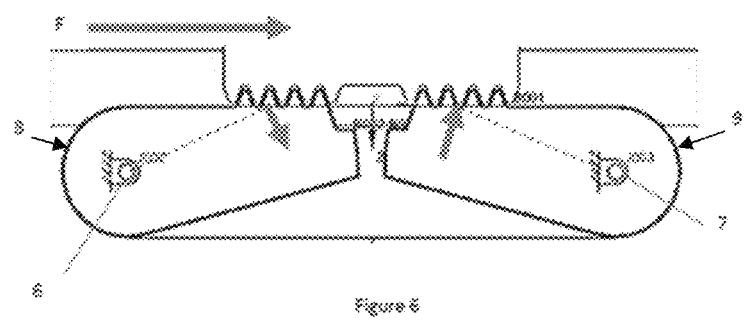
FIG. 6 is a view corresponding to FIG. 4 in which arrows indicate the direction of forces when the steering is being extended in the locked condition.

FIG. 6 shows the clamp mechanism in the locked condition when an axial force F is applied to the shroud in a direction along the axis of the shroud towards a driver, as happens when the driver pulls on the steering wheel to raise themselves from their seat. In this case the cam follower 10 will start to move to the right as shown in the drawing. This will cause the first cam 8 to rotate clockwise and the second cam 9 to also move clockwise. This causes the teeth of the second cam to be pressed firmly into the respective rack of the cam follower, ensuring they will not be able to disengage. Substantive movement of the cam follower is thereby prevented.

Figure 7:
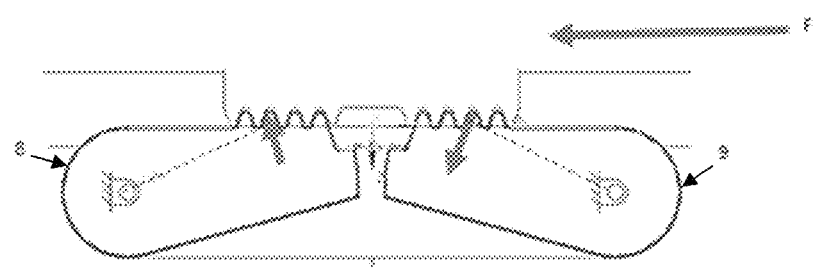
FIG. 7 is a view corresponding to FIG. 4 in which arrows indicate the direction of forces when the steering is being collapsed in the locked condition.

When a force F is applied in the opposite direction, as happens in a frontal impact of a vehicle where a driver is thrown onto the steering wheel the forces all reverse. This can be seen in FIG. 7. The cam follower 10 tries to move to the left as shown in the drawing. This will cause the first cam 8 to rotate anti-clockwise and the second cam 9 to rotate anti-clockwise. The teeth of the first cam now bind with the respective rack of the cam follower ensuring they cannot disengage.

The skilled person will understand that various modifications are possible. For example, the free ends of the cams may face away from one another rather than towards one another so that they rotate clockwise to engage and anti-clockwise to disengage. The cams may be asymmetrical rather than symmetrical allowing material and weigh to be reduced where the axial forces in the two directions along the shroud are expected to differ.

The connection between the lever 15 and the locking pin 14 can also be varied. The exemplary arrangement of FIG. 1 connects the lever to the pin directly by forming a cam on the end of the lever that engages the end of the pin as shown in detail in FIG. 8. In an alternative the lever may connect to the pin through a linkage such as the single arm linkage shown in FIG. 9.

The skilled person will also understand that the clamp mechanism my be underhung as shown in FIG. 1 or overhung as shown in FIGS. 8 and 9. This allows for flexibility in packing of the assembly where space is limited.

The invention claimed is:
1. A steering column assembly for a vehicle, comprising:
a telescopic shroud comprising an upper shroud part and a lower shroud part, the upper shroud part being adjustable to slide over or slide into the lower shroud part to provide adjustment for reach of the steering column assembly,
a steering shaft which is supported by the telescopic shroud, and
a clamp mechanism which releasably fixes the upper shroud part and lower shroud part in position relative to one another in a locked condition whilst permitting relative axial movement of the first shroud part and second shroud part when in an unlocked condition, in which the clamp mechanism comprises:
a first cam arranged to pivot around a first pivot axis that is fixed relative to the upper shroud part and carrying a set of teeth formed on a part of a periphery of the first cam,
a second cam arranged to pivot around a second pivot axis that is fixed relative to the upper shroud part and carrying a set of teeth formed on a part of a periphery of the second cam,
the two pivot axes being spaced apart in an axial direction of the shroud;
a cam follower that is fixed relative to the two pivot axes and relative to the upper shroud portion that carries a first rack of teeth that face the teeth of the first cam and a second rack of teeth that face the teeth of the second cam, the first rack being offset axially from the second rack in the axial direction of the upper shroud portion;
and a locking mechanism that is operable to rotate the two cams around their pivot axes between a first position in which the teeth of both cams are held clear of the respective facing rack of teeth of the cam follower and a second position in which the teeth of both cams are urged into engagement with the teeth of the respective rack of the cam follower,
whereby axial movement of the cam follower as the shroud collapses whilst the clamp mechanism is in the locked position causes the first cam to rotate in a direction that causes an increasing force to be applied from the teeth of the first cam onto the teeth of the first rack of the cam follower
and whereby axial movement of the cam follower as the shroud extends whilst the clamp mechanism is in the locked position causes the second cam to rotate in a direction that cause an increasing force to be applied from the teeth of the second cam onto the teeth of the second rack of the cam follower whilst the second cam moves in an anticlockwise direction to reduce the pressure on the cam follower.

2. The steering column assembly according to claim 1 in which the two cams and the two racks are arranged so that for any given axial movement of the shroud the two cams rotate in opposite directions.

3. The steering column assembly according to claim 2 in which the two cams are flipper-like and face one another with each cam comprising a generally elongate lever with the respective pivot close to one end of the lever and the teeth extending along an edge of the lever located at or towards a free end, the free ends of the two levers facing towards one another.

4. The steering column assembly according to claim 3, in which a length of each lever measured from the pivot axes to at least one of the teeth is greater than a smallest distance between the pivot and any of the teeth of the corresponding rack of the cam follower so that the cam cannot fully rotate as the cam is moved by the cam follower.

5. The steering column assembly according to claim 1, in which the two racks of teeth of the cam follower lie along a plane parallel to an axis of movement of the shroud when moving telescopically.

6. The steering column assembly according to claim 1, in which the clamp mechanism includes a spring that biases the two cams in a direction that engages the teeth of the two cams with the respective racks of teeth of the follower when the clamp mechanism in the locked condition.

7. The steering column assembly according to claim 6 in which the clamp mechanism includes an actuator mechanism for rotating the two cams around their respective pivot axes away from the cam follower against the force of the spring into an unclamped condition.

8. The steering column assembly according to claim 7 in which the actuator mechanism comprises a locking pin that is connected to the two cams at one end and to a hand lever at the other end, the lever operable to cause the pin to translate to move the clamp mechanism between locked and unlocked conditions.

9. The steering column assembly according to claim 3, in which a length of each lever measured from the pivot axes to at least one of the teeth is greater than a smallest distance between the pivot and any of the teeth of the corresponding rack of cam follower so that the cam cannot fully rotate as the cam is moved by the cam follower.

10. The steering column assembly according to claim 9, in which the two racks of teeth of the cam follower lie along a plane parallel to an axis of movement of the shroud when moving telescopically.

11. The steering column assembly according to claim 10, in which the clamp mechanism includes a spring that biases the two cams in a direction that engages the teeth of the two cams with the respective racks of teeth of the follower when clamp mechanism in the locked condition.

12. The steering column assembly according to claim 11, in which the clamp mechanism includes an actuator mechanism for rotating the two cams around their respective pivot axes away from the cam follower against the force of the spring into an unclamped condition.

13. The steering column assembly according to claim 12, in which the actuator mechanism comprises a locking pin that is connected to the two cams at one end and to a hand lever at the other end, the locking pin extending between free ends of each cam the hand lever operable to cause the pin to translate to move the clamp mechanism between locked and unlocked conditions.

* * * * *